US012612006B2

(12) United States Patent
Nayuki

(10) Patent No.: US 12,612,006 B2
(45) Date of Patent: Apr. 28, 2026

(54) POLYAMIDE FIBERS FOR AIRBAG AND METHOD FOR PRODUCING SAME

(71) Applicant: Asahi Kasei Kabushiki Kaisha, Tokyo (JP)

(72) Inventor: Ryo Nayuki, Tokyo (JP)

(73) Assignee: Asahi Kasei Kabushiki Kaisha, Tokyo (JP)

( * ) Notice: Subject to any disclaimer, the term of this patent is extended or adjusted under 35 U.S.C. 154(b) by 346 days.

(21) Appl. No.: 18/020,399

(22) PCT Filed: Oct. 5, 2021

(86) PCT No.: PCT/JP2021/036858
§ 371 (c)(1),
(2) Date: Feb. 8, 2023

(87) PCT Pub. No.: WO2022/075329
PCT Pub. Date: Apr. 14, 2022

(65) Prior Publication Data
US 2023/0286460 A1 Sep. 14, 2023

(30) Foreign Application Priority Data
Oct. 5, 2020 (JP) ................................. 2020-168395

(51) Int. Cl.
*B60R 21/235* (2006.01)
*D01D 5/084* (2006.01)
(Continued)

(52) U.S. Cl.
CPC ........... *B60R 21/235* (2013.01); *D01D 5/084* (2013.01); *D01D 5/0885* (2013.01); *D01F 6/60* (2013.01);
(Continued)

(58) Field of Classification Search
None
See application file for complete search history.

(56) References Cited

U.S. PATENT DOCUMENTS 3,493,646 A 2/1970 Larkin et al.
5,514,471 A 5/1996 Okano et al.
(Continued)

FOREIGN PATENT DOCUMENTS

CN 1609300 A 4/2005
CN 102046859 A 5/2011
(Continued)

OTHER PUBLICATIONS

Machin Translation of WO2011055562 (Year: 2011).*
(Continued)

*Primary Examiner* — Shawn Mckinnon
(74) *Attorney, Agent, or Firm* — Morgan, Lewis & Bockius LLP

(57) ABSTRACT

The present disclosure pertains to: polyamide fibers for an airbag which are characterized in that the fiber size thereof is 200-800 dtex, inclusive, and the stress retention rate thereof when obtained using a prescribed procedure is at least 3.0%; and a method for producing said polyamide fibers for an airbag, the method being characterized in that during the thermosetting step and the relaxing step thereof, the contact time between thread and a roller which is at least 190° C. is at least 30 msec and less than 110 msec, the temperature of the thermosetting roller is 190-205° C., inclusive, the temperature of the relaxing roller is greater than 100° C. and less than 190° C., and the speed ratio of the relaxing roller to the thermosetting roller satisfies this equation: 1.00<relaxing roller speed/thermosetting roller speed<1.10.

8 Claims, 1 Drawing Sheet

(51) Int. Cl.

| | |
|---|---|
| *D01D 5/088* | (2006.01) |
| *D01F 6/60* | (2006.01) |
| *D03D 1/02* | (2006.01) |

(52) U.S. Cl.

CPC ...... *D03D 1/02* (2013.01); *B60R 2021/23509* (2013.01); *B60R 2021/23542* (2013.01); *D10B 2331/02* (2013.01); *D10B 2401/06* (2013.01); *D10B 2505/124* (2013.01)

(56) References Cited

U.S. PATENT DOCUMENTS

| | | | |
|---|---|---|---|
| 2005/0089654 A1 | 4/2005 | Yu et al. | |
| 2011/0020628 A1 | 1/2011 | Fukudome et al. | |
| 2014/0265279 A1* | 9/2014 | Ise | D01D 5/12 |
| | | | 428/401 |
| 2014/0302263 A1 | 10/2014 | Ise et al. | |
| 2020/0353889 A1 | 11/2020 | Kamimura et al. | |

FOREIGN PATENT DOCUMENTS

| | | |
|---|---|---|
| CN | 111423578 A | 7/2020 |
| EP | 3760771 A1 | 1/2021 |
| JP | S46-024730 B | 7/1971 |
| JP | H05-156513 A | 6/1993 |
| JP | H06-248508 A | 9/1994 |
| JP | 2887328 * | 4/1999 |
| JP | 2000-027029 A | 1/2000 |
| JP | 2000-129530 A | 5/2000 |
| JP | 2004-156166 A | 6/2004 |
| JP | 2004-176221 A | 6/2004 |
| JP | 2008-133566 A | 6/2008 |
| JP | 2008-156770 A | 7/2008 |
| JP | 2011-168919 A | 9/2011 |
| JP | 2011-168938 A | 9/2011 |
| JP | 5253685 B1 | 7/2013 |
| JP | 5969999 B2 | 8/2016 |
| KR | 10-1611579 B1 | 4/2016 |
| KR | 10-2017-0017376 A | 2/2017 |
| WO | WO2011055562 * | 5/2011 |
| WO | 2019/039396 A1 | 2/2019 |

OTHER PUBLICATIONS

Machine Translation of JP2887328 (Year: 1999).*
International Search Report issued in corresponding International Patent Application No. PCT/JP2021/036858 dated Dec. 21, 2021.
International Preliminary Report on Patentability and Written Opinion issued in corresponding International Patent Application No. PCT/JP2021/036858 dated Apr. 20, 2023.
Supplementary European Search Report issued in European Patent Application No. 21877628.4 dated Feb. 20, 2025.

* cited by examiner

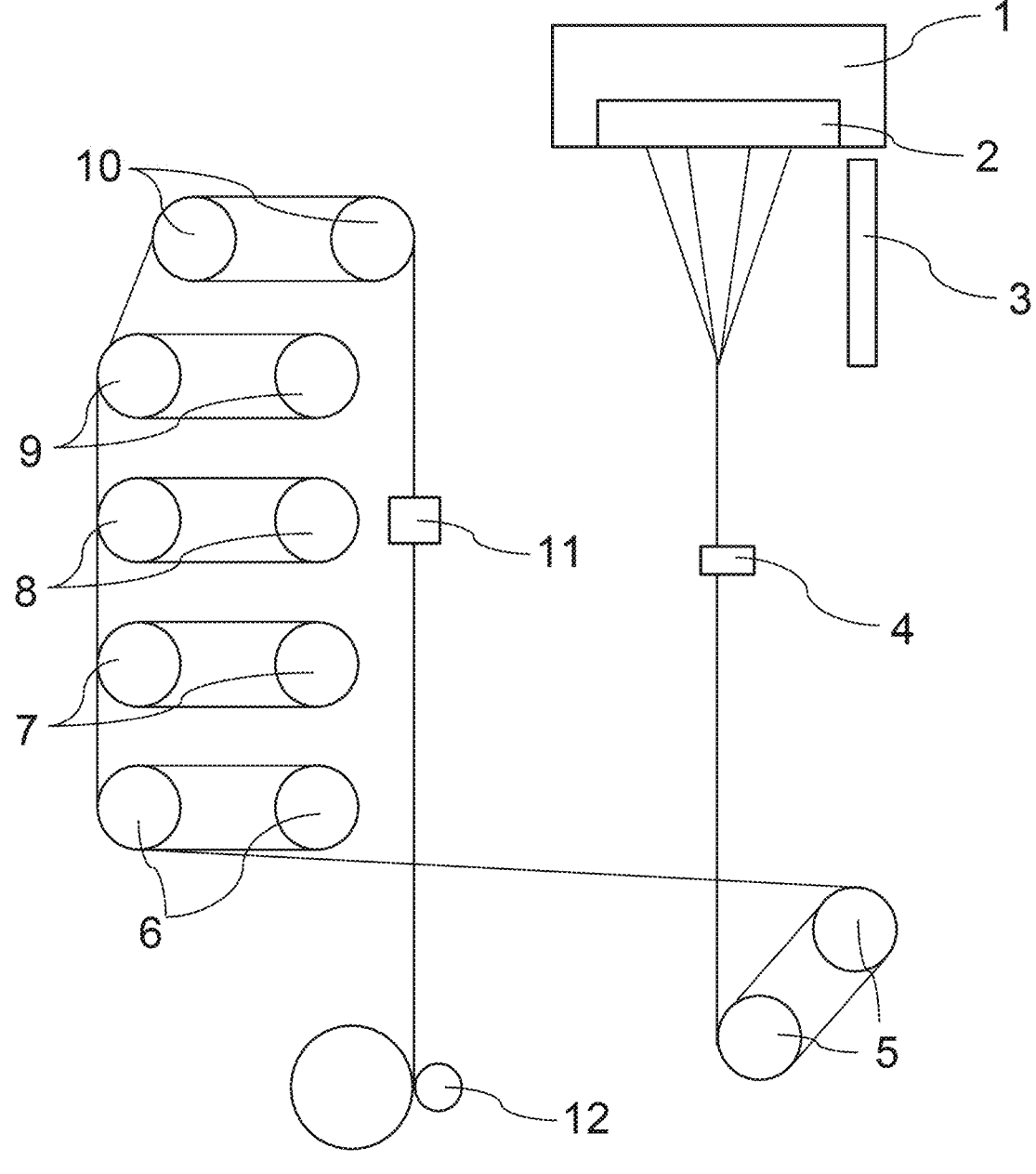

POLYAMIDE FIBERS FOR AIRBAG AND METHOD FOR PRODUCING SAME

FIELD

The present invention relates to polyamide fibers for an airbag and to a method for producing them.

BACKGROUND

Polyamide fibers are used in high-density fabrics for usage as a diverse range of materials. One of the important uses of such materials is for airbags.

Airbag devices are a type of safety equipment for constraining riders during vehicle collision accidents. An airbag device comprises an impact sensor, an inflator (gas generator) and an airbag. Airbags are composed of polyamide fiber woven fabrics, and are able to withstand the heat of propellant reaction by the inflator, functioning to expand within several tens of milliseconds, absorbing the incoming energy of the rider with the inflation gas of the expanded bag. For this reason there is a need for bag-forming woven fabrics with low air flow rates. For increased rider constrainment there is still further need to prevent gas leakage from the woven fabric when the internal pressure of an airbag has increased, in order to maintain at least a fixed internal pressure when the airbag is expanded and employed.

After having been woven to a high density, an airbag woven fabric undergoes shrinkage by heating of the fabric during the post-weaving processing steps, thereby allowing the density of the fabric to be increased in order to reduce the air permeability.

PTL 1 discloses a method of modifying the physical properties of fibers used in a woven fabric to improve the weft yarn threading stability and increase the homogeneity of the physical properties of the woven fabric.

PTL 2 discloses a woven fabric with excellent mesh opening resistance and burst resistance, by controlling the heat shrinkage behavior of the fibers.

CITATION LIST

Patent Literature

[PTL 1] Japanese Patent Publication No. 5253685
[PTL 2] Japanese Patent Publication No. 5969999

SUMMARY

Technical Problem

In the post-weaving processing steps for a woven fabric, shrinkage stress occurs due to heating as one behavior of the fibers composing the woven fabric, resulting in shrinkage of the woven fabric. The woven fabric relaxes as shrinkage stress is subsequently reduced when heating is stopped and the temperature is restored to ordinary temperature. Relaxation of the woven fabric can potentially create wrinkles in the woven fabric surface instead of uniformly propagating throughout the entire woven fabric. When the uniformity of the woven fabric is lowered, this may result in unstable air permeability performance. A need therefore exists for further improvement of processed woven fabrics by limiting wrinkles and increasing uniformity.

PTL 1 does not examine how to inhibit the lowered uniformity of woven fabrics in post-weaving thermal processing steps. There is also some room for improvement in air permeability since the air permeability only at a specific pressure is used as the indicator, and the publication does not examine how to reduce changes in air permeability when the internal pressure changes, which is desirable from the viewpoint of rider protection.

PTL 2 assumes processing at a relatively low temperature of 120° C., without examining heat shrinkage behavior in processing temperature ranges that cause fabric shrinkage at high temperature, which is one aspect of the present invention. Moreover, since the publication does not examine improving the uniformity of woven fabrics after heat shrinkage processing and inhibiting changes in air permeability with different internal pressures, some room for improvement still remains.

In light of the current level of technology, the problem to be solved by the invention is to provide polyamide fibers for an airbag that when used in a woven fabric for an airbag, can inhibit fabric wrinkles after heat shrinkage processing and can inhibit variation in air permeation properties, by increasing uniformity.

Solution to Problem

As a result of much research with the goal of solving this problem, the present inventors have devised this invention after finding that it is possible to improve wrinkles and uniformity of a woven fabric by limiting the heat shrinkage behavior of the weaving yarn forming the woven fabric during and after heating to specific values.

Specifically, the present invention provides the following.
[1] Polyamide fibers for an airbag, wherein
the size of the fibers is 200 dtex to 800 dtex, and
the stress retention is 3.0% or greater, as determined by the following steps 1) to 6):
1) the fibers are immersed for 5 seconds in water at 20° C. and removed out, and subsequently anchored in a thermal shrinkage stress measuring device under an initial load of 0.4 mN/dtex;
2) a heating furnace is set to 130° C. and the fibers are placed in the heating furnace for 5 minutes and heated;
3) the fibers are removed out of the heating furnace and the temperature of the heating furnace is increased to 190° C., without releasing the anchoring that holds the fibers during that time, to maintain fixed lengths,
4) after the furnace has reached 190° C., the fibers are placed in the heating furnace for 3 minutes and heated, and the shrinkage stress at 3 minutes after heating is measured;
5) the fibers are removed from the heating furnace, and the shrinkage stress is measured at 3 minutes after removal; and
6) the stress retention is calculated by the following formula:

$$\text{Stress retention (\%)} = \{[\text{Residual stress from step 5)}]/[\text{shrinkage stress from step 4)}]\} \times 100,$$

where [shrinkage stress from step 4)] is the value of the shrinkage stress determined in step 4) minus the value of initial load applied in step 1), and [residual stress from step 5)] is the value of the shrinkage stress determined in step 5) minus the value of the initial load applied in step 1).
[2] The polyamide fibers for an airbag according to [1] above, wherein the stress retention is 5.0% or greater.
[3] The polyamide fibers for an airbag according to [1] or [2] above, wherein the tensile strength is 7.5 cN/dtex or greater.

[4] The polyamide fibers for an airbag according to any one of [1] to [3] above, wherein the size is 340 dtex to 500 dtex.

[5] The polyamide fibers for an airbag according to any one of [1] to [4] above, wherein the single fiber size is 1.0 dtex to 7.0 dtex.

[6] The polyamide fibers for an airbag according to any one of [1] to [5] above, wherein the polyamide fibers for an airbag are polyamide 6/6 fibers.

[7] A woven fabric for an airbag comprising polyamide fibers for an airbag according to any one of [1] to [6] above.

[8] A method for producing polyamide fibers for an airbag according to any one of [1] to [6] above, the method including the following steps:

a step of application of a water-containing oil onto yarn spun from a spinneret followed by hot stretching;

a stretching step;

a heat setting step; and a relaxing step, wherein in the heat setting step and relaxing step, the contact time between the yarn and any roller at 190° C. or higher is at least 30 msec and less than 110 msec, the temperature of the heat setting roll in the heat setting step is 190° C. to 205° C., the temperature of the relaxing roll in the relaxing step is higher than 100° C. and lower than 190° C., and the speed ratio between the relaxing roll and the heat setting roll satisfies the following formula:

$$1.00 < \text{relaxing roll speed/heat setting roll speed} < 1.10.$$

Advantageous Effects of Invention

The polyamide fibers for an airbag according to the invention can be used to provide a woven fabric for an airbag having reduced fabric wrinkles and excellent uniformity.

BRIEF DESCRIPTION OF DRAWINGS

FIG. 1 shows an example of production equipment for polyamide fibers for an airbag according to a preferred embodiment (3-stage stretching process).

DESCRIPTION OF EMBODIMENTS

The invention will now be explained in detail using an embodiment.

One embodiment of the invention provides polyamide fibers for an airbag, wherein the size of the fibers is 200 dtex to 800 dtex, and the stress retention is 3.0% or greater, as determined by the following steps 1) to 6):

1) the fibers are immersed for 5 seconds in water at 20° C. and removed out, and subsequently anchored in a thermal shrinkage stress measuring device under an initial load of 0.4 mN/dtex;

2) a heating furnace is set to 130° C. and the fibers are placed in the heating furnace for 5 minutes and heated;

3) the fibers are removed out of the heating furnace and the temperature of the heating furnace is increased to 190° C., without releasing the anchoring that holds the fibers during that time, to maintain fixed lengths, 4) after the furnace has reached 190° C., the fibers are placed in the heating furnace for 3 minutes and heated, and the shrinkage stress at 3 minutes after heating is measured;

5) the fibers are removed from the heating furnace, and the shrinkage stress is measured at 3 minutes after removal; and 6) the stress retention is calculated by the following formula:

$$\text{Stress retention (\%)} = \{[\text{Residual stress from step 5})]/ [\text{shrinkage stress from step 4)}]\} \times 100,$$

where [shrinkage stress from step 4)] is the value of the shrinkage stress determined in step 4) minus the value of the initial load applied in step 1), and [residual stress from step 5)] is the value of the shrinkage stress determined in step 5) minus the value of the initial load applied in step 1).

The polymer used to form the polyamide fibers of the embodiment may be a polymer comprising polyamide 6, polyamide 6/6, polyamide 11, polyamide 12, polyamide 6/10, polyamide 6/12 or polyamide 4/6, or any of their copolymers or blends. Particularly preferred are polyamide 6/6 polymers, polyamide 6/6 fiber being composed mainly of polyhexamethylene adipamide resin. Polyhexamethylene adipamide fiber is a polyamide fiber with a melting point of 250° C. or higher, composed of 100% hexamethylenediamine and adipic acid, but polyamide 6/6 fiber may also be fiber wherein polyamide 6, polyamide 6/1, polyamide 6/10 or polyamide 6/T, for example, is copolymerized or blended with polyhexamethylene adipamide, in a range such that the melting point of the resin is not below 250° C. Such fibers may include various commonly used additives for improving productivity in the thread production process or finishing process, or for improving the properties. For example, heat stabilizers, antioxidants, light stabilizers, lubricating agents, antistatic agents, plasticizers, thickeners, pigments, flame retardants and the like may be added.

The total fineness of the polyamide fiber is in the range of 200 dtex to 800 dtex, more preferably 200 dtex to 700 dtex, even more preferably 300 dtex to 600 dtex and most preferably 340 dtex to 500 dtex. More adequate mechanical strength is exhibited as the total fineness increases above 200 dtex, while more excellent storability is obtained as it is less than 800 dtex.

The single fiber size is preferably in the range of 1 dtex to 7 dtex, more preferably 1.5 dtex to 6.0 dtex, even more preferably 2.5 dtex to 5.7 dtex and most preferably 3.3 dtex to 4.9 dtex. A single fiber size of 1 dtex or greater will tend to avoid problems in terms of yarn productivity, and is also suitable from the standpoint of weavability. Woven fabrics obtained with single fiber sizes of 7 dtex and lower are softer and progressively more easy to store by compact folding, while also tending to exhibit lower air permeability even with high differential pressure such as during airbag deployment.

For this embodiment, the polyamide fibers are preferably woven and used in a woven fabric for an airbag. The woven fabric for an airbag is preferably a high density woven fabric from the viewpoint of mechanical properties and low air permeability. A high density woven fabric can be produced by a method of increasing the woven density during weaving or a method of shrinking the woven fabric by heat treatment during the weaving process to increase its density. Increasing woven density during weaving can lead to poor weavability due to friction between warp yarns or poor productivity due to increased frequency of insertion of the weft yarn per unit length, and therefore in order to achieve both weavability/productivity and a higher-density woven fabric it is effective to increase the density by heat shrinkage during the post-weaving processing steps.

In the post-weaving processing steps, the woven fabric is first scoured with water, after which it is passed through a drying step using a hot air dryer or hot roll heater, and fed to a heat setting step using a hot roll heater or tenter, and finally taken up. For the thermal behavior of the weaving yarn composing the woven fabric, it is once heated in the drying step after immersion in water and then allowed to cool, and subsequently reheated in a heat setting step and then allowed to cool. The weaving yarn is in a constrained state when in the form of a woven fabric. The thermal shrinkage stress of the fibers was measured by the following steps 1) to 6), as an indicator of the thermal behavior of the weaving yarn during the processing steps.

Step 1) the fibers are immersed for 5 seconds in water at 20° C. and removed out, and subsequently anchored in a thermal shrinkage stress measuring device under an initial load of 0.4 mN/dtex;

Step 2) a heating furnace is set to 130° C. and the fibers are placed in the heating furnace for 5 minutes and heated:

Step 3) the fibers are removed out of the heating furnace and the temperature of the heating furnace is increased to 190° C., without releasing the anchoring that holds the fibers during that time, to maintain fixed lengths, Step 4) after the furnace has reached 190° C., the fibers are placed in the heating furnace for 3 minutes and heated, and the shrinkage stress at 3 minutes after heating is measured;

Step 5) the fibers are removed from the heating furnace, and the shrinkage stress is measured at 3 minutes after removal; and Step 6) the stress retention is calculated by the following formula:

$$\text{Stress retention (\%)} = \{[\text{Residual stress from step 5})]/[\text{shrinkage stress from step 4})]\} \times 100,$$

where [shrinkage stress from step 4)] is the value of the shrinkage stress determined in step 4) minus the value of the initial load applied in step 1), and [residual stress from step 5)] is the value of the shrinkage stress determined in step 5) minus the value of the initial load applied in step 1). Measurement of the shrinkage stress in step 4) is carried out in a heating furnace.

Step 4) corresponds to heating in the heat setting step, whereby the woven fabric increases in density due to heat shrinkage. Step 5) corresponds to a cooling/winding step in the heat setting step, whereby relaxation takes place according to the degree of stress reduction.

The present inventors have found that the stress retention (%) in step 6) correlates with the appearance and uniformity of the processed woven fabric.

In other words, the stress retention represents the proportion of post-cooling residual stress with respect to the thermal shrinkage stress generated in the heat setting step. The polyamide fibers of the embodiment have a stress retention of 3% or greater and preferably 5% or greater. A stress retention of 3% or greater will result in lower relaxation of the woven fabric after the heat shrinkage step, allowing the tight state of the fabric to be maintained and consequently resulting in uniform air permeability for the fabric and more uniform tension on the constituent yarn so that fewer wrinkles are produced. The upper limit for the stress retention is not particularly restricted and may be 30% or lower, 20% or lower or 10% or lower.

The (tensile) strength of the polyamide fibers is preferably in the range of 7.5 cN/dtex to 11.5 cN/dtex, and is more preferably 8.0 cN/dtex to 11.5 cN/dtex and most preferably 8.2 cN/dtex to 11.5 cN/dtex. A strength of 7.5 cN/dtex or greater provides the desired mechanical properties and is sufficient for industrial use fibers, while a strength of 11.5 cN/dtex or lower provides excellent fiber quality, which will reduce the frequency of broken filaments and avoid reduced spinning yields or weaving problems during post-treatment, for example.

The polyamide fibers of the embodiment can be produced by a melt spinning method. FIG. 1 shows a 3-stage stretching process as an example using equipment for production of polyamide fibers.

Another embodiment of the invention is the aforementioned method for producing polyamide fibers for an airbag, which includes the following steps:

a step of application of a water-containing oil onto yarn spun from a spinneret followed by hot stretching;

a stretching step;

a heat setting step; and a relaxing step, wherein in the heat setting step and relaxing step, the contact time between the yarn and any roller at 190° C. or higher is at least 30 msec and less than 110 msec, the temperature of the heat setting roll in the heat setting step is 190° C. to 205° C., the temperature of the relaxing roll in the relaxing step is higher than 100° C. and lower than 190° C., and the speed ratio between the relaxing roll and the heat setting roll satisfies the following formula:

$$1.00 < \text{relaxing roll speed/heat setting roll speed} < 1.10.$$

Each step will now be explained in detail.

Yarn spun out from a spinneret pack 2 provided in the melt spinning machine is immediately solidified by cooling for between 0.5 m/sec and 1.5 m/sec with cold air supplied from a cold air cylinder 3.

An oil is then applied at 0.5% to 2.0% using a lubricator 4, and the yarn is wound up onto a take-up roll 5. The oil applied using the lubricator is preferably an aqueous emulsion (water-containing oil), and preferably has excellent smoothness to facilitate stretching of the yarn during the silk reeling step, and also heat resistance from the viewpoint of yarn quality and use as an industrial material. Examples of preferred oil compositions satisfying such properties are oils composed mainly of divalent fatty acid ester compounds, alkylene oxide-containing divalent fatty acid ester compounds, polyhydric alcohol-alkylene oxide addition products, and alkylene oxide-containing polyhydric alcohol-alkylene oxide addition products. The polyamide spun from the spinneret in the melt spinning step undergoes progressive crystallization as it cools. When water molecules are present in the polymer during the course of progressive crystallization, the water molecules interact with the amide groups of the polyamide by hydrogen bonding, forming crystals around the water molecules and resulting in progressive crystallization. During the spinning step, an aqueous emulsion oil is added to the yarn spun from the spinneret 2 to allow the water molecules to infiltrate the yarn, resulting in progressive crystallization on the surface of the monofilaments forming the yarn. This forms a highly crystalline layer on the fiber surfaces.

The mobility of the amorphous portion is also increased by infiltration of water molecules into the amorphous portions of the polyamide fibers, and cleaving of the hydrogen bonds between polyamides. When a drying step is carried out after water scouring in the post-weaving processing steps, heat treatment is carried out with numerous water molecules infiltrating the amorphous portions of the fibers, thus causing shrinkage of the fiber as the amorphous portion undergoes strain relaxation. This promotes strain relaxation of the fiber interiors, reducing strain in the fiber interiors and lowering the shrinkage stress (residual stress) after heat treatment. Since fibers with an aqueous emulsion oil have a highly crystalline layer on the fiber surfaces, infiltration of impregnated water molecules into the fiber interiors upon immersion in water is inhibited during the post-weaving processing steps, thus reducing strain relaxation by the heat treatment and helping to maintain high residual stress after heat treatment.

For this embodiment, the fibers were produced using common roll-to-roll production equipment. With roll-to-roll equipment it is possible to produce desired physical properties by differences in roll speeds and by application of heat. Each roll has a different function, a stretching roll that stretches the fibers, a heat setting roll that structurally anchors them by molecular relaxation and progressive crystallization inside the fibers, and a relaxing roll that adjusts the tension during take-up of the product. The fibers that have been spun from the spinneret and coated with oil by the lubricator are taken up onto the take-up roll 5 and continuously supplied to the stretching step without winding. The stretching step is a step of stretching of the fibers to 20% or greater by the difference in speed between rolls. When the speed of one roll is compared with the speed of the subsequent roll, if the speed of the subsequent roll is at least 20% with respect to the first roll then the first roll is defined as the stretching roll. The stretching step is preferably a multistage stretching process. Stretching of spun yarn is preferably first early-stage stretching at a low temperature of below 150° C. followed by late-stage stretching at a high temperature of 150° C. or above, with respect to the total stretch ratio required to obtain the necessary tensile strength, and finally tension and relaxation by heat setting and relaxation treatment for structural anchoring, and take-up. The early-stage stretching and late-stage stretching may both be multi-stage stretching steps. The number of stages for stretching is not restricted, but a 2-stage stretching process is preferred, and a 3-stage stretching process is more preferred. The stretching step shown in the attached drawing is carried out with an apparatus comprising a first stretching roll 6, a second stretching roll 7, a third stretching roll 8, a heat setting roll 9 and a relaxing roll 10, each adjusted to obtain the desired physical properties, for successive winding and stretching heat treatment of the yarn. Gentle tension is maintained between the take-up roll and first stretching roll. The preferred elongation percentage between the rolls is in the range of 0.5% to 5%. The surface temperature of the take-up roll is preferably 20° C. to 50° C. For stretching in a low temperature range of below 150° C. in the subsequent early-stage stretching process, the temperature of the first stretching roll is preferably 40° C. or higher and lower than 150° C., and the temperature of the second stretching roll is preferably at least the stretching temperature of the first roll and below 150° C. The temperature of the third stretching roll that performs the stretching in a high temperature range in the late-stage stretching is 150° C. to 190° C.

Yarn that has passed through the stretching step is then supplied to a heat setting step. The heat setting step is a step following the stretching step, in which heat is applied to the fibers on the roll to anchor the fiber structures. For the purpose of the present application it is essential for a heat setting roll to be placed between the stretching roll and the relaxing roll. The temperature of the heat setting roll is 190° C. to 205° C. In the heat setting step, heat causes increase in movement of the amorphous portion inside the fibers, resulting in strain relaxation, and crystallization. If the temperature of the heat setting roll is 190° C. or higher, growth of the crystal layer on the outer layer portions of the fibers will be adequate and it will be possible to inhibit infiltration of water molecules into the fiber interiors and inhibit strain relaxation during the processing steps for weaving, thereby increasing residual stress, and if the temperature is 205° C. or below, strain relaxation in the fiber interiors will be low, and residual stress will increase after heat treatment has been carried out during the processing steps for weaving.

Yarn that has passed through the heat setting step is then supplied to a relaxing step. The relaxing step is a step in which the fibers are contracted causing strain relaxation within the fibers, and tension is adjusted during take-up. For contraction of the fibers it is necessary to lower the speed ratio between rolls or between a roll and winder to less than 1. Specifically, if a roll situated after a first roll, or a winder, is slower than the first roll, the first roll is defined as the relaxing roll. It is essential for the temperature of the relaxing roll to be higher than 100° C. and lower than 190° C. The relaxing roll temperature is more preferably higher than 155° C. and lower than 187° C., and even more preferably higher than 170° C. and lower than 187° C. If the temperature of the relaxing roll is 190° C. or higher, relaxation treatment at high temperature will result in strain relaxation in the fibers, a lower residual stress value after weaving and lower stress retention, while a temperature of 100° C. or lower will result in insufficient strain relaxation in the fibers and lower dimensional stability.

According to the embodiment it is essential for the contact time between rolls at 190° C. or higher in the heat setting treatment and relaxation treatment to be at least 30 msec and less than 110 msec. The contact time is more preferably 40 msec to 100 msec and even more preferably 50 msec to 95 msec. Heating of the fibers in the heat setting treatment and relaxation treatment promotes movement of the polymer in the fibers and eliminates strain inside the fibers. If the contact time with rolls at 190° C. or higher is 110 msec or longer, strain relaxation within the fibers will be inhibited, residual strain after heating will increase during post-weaving thermal processing, and residual stress will increase after thermal processing, while if it is 30 msec or longer, growth of the crystal layer formed on the fiber surface sections will be sufficient, infiltration of water molecules during weaving will be inhibited, and strain relaxation during heat treatment will be inhibited, allowing residual stress to be increased.

For this embodiment, the speed ratio between the heat setting roll and relaxing roll preferably satisfies the following formula:

$$1 < \text{relaxing roll speed/heat setting roll speed} < 1.10.$$

The speed ratio is more preferably greater than 1.01 and less than 1.09. If the speed ratio is greater than 1, the fibers will be pulled between the heat setting roll and relaxing roll, placing the molecules in a state of tension and inhibiting strain relaxation within that zone, and consequently reducing residual stress after the heat treatment step and increasing the stress retention. If the speed ratio is less than 1.10, on the other hand, structural changes due to stretching will be reduced and the crystal layer that has grown in the heat setting step will remain without being destroyed, and consequently in the post-weaving processing steps, infiltration of water molecules into the fiber interiors will be inhibited and strain relaxation will also be inhibited, resulting in greater residual stress and higher stress retention. These factors make it possible to determine the conditions under which stress retention is maximally increased in a speed ratio range of greater than 1 and less than 1.10.

Yarn subjected to relaxation treatment is taken up onto a winder 12. In order to prevent dispersion of the yarn in the weaving step, a high pressure fluid may be blasted onto the yarn between the relaxing roll and the winder to cause tangling in the yarn, and the yarn may be taken up while converging. A publicly known interlacing apparatus 11 may be appropriately used as the apparatus used for tangling of the yarn.

In order to adjust the stress retention to within the prescribed range for this embodiment, it is essential to use a water-containing oil to adjust the contact time between the yarn and rolls at 190° C. or higher in the heat setting treatment step and relaxation treatment step, to at least 30 msec and less than 110 msec, and to set the temperature of the heat setting roll to be 190° C. to 205° C., to set the temperature of the relaxing roll to be higher than 100° C. and lower than 190° C., and to set the relaxing roll speed/heat setting roll speed to greater than 1.00 and less than 1.10, as the speed ratio between the relaxing roll and the heat setting roll.

EXAMPLES

The invention will now be explained in detail through Examples and Comparative Examples, with the understanding that these Examples are not limitative on the invention. The measured values mentioned in the Examples were measured by the following methods.

(1) Formic Acid Relative Viscosity (VR)

A 4.5 g sample portion was thoroughly dissolved in 90% formic acid to a concentration of 8.4 wt %, and then a Ubbelohde viscometer was used to measure the falling time of the solution after standing for 10 minutes in an environment with a 25° C. water temperature. The solvent falling time was evaluated by the same method, and the VR was determined using the following formula:

$$VR = (\text{sample solution falling time (sec)/solvent falling time (sec)}.$$

(2) Fluff Quality

The obtained fiber package was taken up at a speed of 450 m/min, a "LV-H62" laser detector by Keyence Corp. was set at a location 2 mm from the winding yarn, and the total number of detected broken filaments in the yarn (fluff) was calculated as the number per 100,000 in, being given an evaluation of "VG" for a value of 0 or 1, "G" for 2 to 3, "F" for 4 to 9 or "P" for 10 or greater. The total number of broken filaments in the yarn was the number of times laser shielding was detected during measurement with the laser detector.

(3) Total Fineness (Dtex)

Measurement was carried out according to the method described in JIS L 1017 8.3.

(4) Single Fiber Size (Dtex)

The total fineness determined by the method described in JIS L 1017 8.3 was divided by the number of monofilaments forming the yarn.

(5) (Tensile) Strength (cN/Dtex) and Tensile Breaking Elongation (%)

The tensile strength measured by the method described in JIS L 1017 8.5 was divided by the total fineness. The ductility at breakage was also determined.

(6) Thermal Shrinkage Stress (mN/Dtex)

Using a thermal shrinkage stress measuring device (Thermal Shrinkage Tester: TST510 by Lenzing Instruments), a 70 cm measuring fiber sample was anchored with an initial applied load of 0.4 mN/dtex by mounting a deadweight at one end of the fiber, and the shrinkage stress during heating was measured.

(7) Stress Retention (%)

The thermal shrinkage stress measuring device mentioned above was used for measurement by the following steps 1) to 6).

Step 1) the fibers are immersed for 5 seconds in water at 20° C. and removed out, and subsequently anchored in a thermal shrinkage stress measuring device under an initial load of 0.4 mN/dtex;

Step 2) a heating furnace is set to 130° C. and the fibers are placed in the heating furnace for 5 minutes and heated;

Step 3) the fibers are removed out of the heating furnace and the temperature of the heating furnace is increased to 190° C., without releasing the anchoring that holds the fibers during that time, to maintain fixed lengths, Step 4) after the furnace has reached 190° C., the fibers are placed in the heating furnace for 3 minutes and heated, and the shrinkage stress at 3 minutes after heating is measured;

Step 5) the fibers are removed from the heating furnace, and the shrinkage stress is measured at 3 minutes after removal; and Step 6) the stress retention is calculated by the following formula:

$$\text{Stress retention (\%)} = \{[\text{Residual stress from step 5)}]/ [\text{shrinkage stress from step 4)}]\} \times 100,$$

where [shrinkage stress from step 4)] is the value of the shrinkage stress determined in step 4) minus the value of the initial load applied in step 1), and [residual stress from step 5)] is the value of the shrinkage stress determined in step 5) minus the value of the initial load applied in step 1).

The measuring steps 1) to 6) were carried out 5 times and the average value was recorded as the stress retention.

(8) Post-Processing Wrinkles

A plain weave fabric was obtained using the polyamide fibers in a water jet room, without twisting and without gluing the fibers. The woven fabric was then washed for 1 minute at 50° C. in a widened state and cylinder-dried at 130° C., after which a pin tenter was used for heating at 190° C. for 1 minute followed by quenching, and the obtained heat-treated wound woven fabric was examined for outer appearance, evaluating the number of wrinkles with lengths of 50 cm or greater within 500 m in the lengthwise direction on the following scale.

P: ≥10 wrinkles
F: 2 to 9 wrinkles
G: 0 to 1 wrinkle (9) Dynamic Air Permeability Curve Exponent This was measured according to ASTM D6476.

An FX3350 airbag air permeability tester by Textest was used, with a test head of 200 cm³. The compressed air pressure filling the test head (START PRESSURE) was adjusted so that the maximum pressure on the fabric was 100±5 kPa. The compressed air in the test head was released while directed on the fabric sample, periodically measuring the pressure and air permeability, and the dynamic air permeability curve exponent was calculated with the FX3350 from the obtained pressure-dynamic air permeability curve.

(10) Dynamic Air Permeability Curve Exponent CV Value (%)

With the length in the base fabric cross-machine direction as 100%, the dynamic air permeability curve exponent at positions of 25%, 50% and 75% from the edge was measured by the method described above. The measurement was conducted 10 times every 10 m in the machine direction, and the dynamic air permeability curve exponent CV value (%) was calculated from measurement data for a total of 30 points using the following formula:

> Dynamic air permeability curve exponent CV value (%)={(Standard deviation for dynamic air permeability curve exponent)/(average for dynamic air permeability curve exponent)}×100

Example 1

Using an apparatus as shown in FIG. 1, a polyamide 6/6 polymer with a 90% formic acid relative viscosity of 85, obtained by a common polymerization method, was melted at 300° C., the temperature was made uniform with a spin head (1), and the melt was discharged from a 136-hole spinneret (2) and taken up by a direct spin-drawing process, to spin a 470 dtex, 136-filament polyamide 6/6 fiber. Specifically, the discharged polyamide 6/6 polymer was cooled to solidification in a cold air chamber (3) to form yarn, and then successively passed through a lubricator (4), to a take-up roller (5), from a first stretching roller (6) to a third stretching roller (8), and to a heat setting roller (9) and a relax roller (10), and the yarn was tangled using an interlacing apparatus (11) and taken up.

The temperature of each roller was unheated for the take-up roller (5), 65° C. for the first stretching roller (6), 140° C. for the second stretching roller (7) and 190° C. for the third stretching roller (8). The heat setting roller (9) was set to 190° C. and the relax roller (10) was set to 185° C. The contact time with the heat setting roller was 93 msec. As stretching distribution, the first stretching roller/take-up roller speed ratio was 1.01, the second stretching roller/first stretching roller speed ratio was 2.34, the third stretching roller/second stretching roller speed ratio was 1.50 and the heat setting roller/third stretching roller speed ratio was 1.30. In the heat setting step and relaxation treatment step, take-up was with a relax roller/heat setting roller speed ratio of 1.03 and a winder/relax roller speed ratio of 0.93. The winder speed was 3000 m/min. The number of winds onto each roller was 3 times for the first stretching roller, 3 times for the second stretching roller, 3 times for the third stretching roller, 7 times for the heat setting roller and 4.5 times for the relax roller. The oil coverage was 1.0 wt %, and an aqueous oil was used with 80 wt % water among the components. The physical properties of the obtained polyamide 6/6 fibers are shown in Table 1 below.

A plain weave fabric was obtained using the polyamide 6/6 fibers in a water jet room, without twisting and without gluing the fibers. The fabric was then washed for 1 minute at 50° C. in a widened state and cylinder-dried at 130° C., after which a pin tenter was used for heating at 190° C. for 1 minute followed by quenching and heat setting, to obtain a woven fabric for an airbag with a woven density of 53/2.54 cm for both the warp yarn and weft yarn. The woven fabric was examined for generation of wrinkles and measured for dynamic air permeability, with the evaluation results shown in Table 1.

Example 2

This was carried out in the same manner as Example 1, except that the number of holes of the spinneret used for spinning was 72. The physical properties of the obtained polyamide 6/6 fibers and the evaluation results for the woven fabric are shown in Table 1.

Example 3

This was carried out in the same manner as Example 1, except that the size of the spun fiber was 350 dtex, and the woven density was 60/2.54 cm for both the warp yarn and weft yarn of the woven fabric after weaving. The physical properties of the obtained polyamide 6/6 fibers and the evaluation results for the woven fabric are shown in Table 1.

Example 4

This was carried out in the same manner as Example 1, except that the number of winds on the heat setting roller was 4 times, and the contact time with the heat setting roller was 53 msec. The physical properties of the obtained polyamide 6/6 fibers and the evaluation results for the woven fabric are shown in Table 1.

Example 51

This was carried out in the same manner as Example 1, except that the temperature of the heat setting roller was 200° C. The physical properties of the obtained polyamide 6/6 fibers and the evaluation results for the woven fabric are shown in Table 1.

Example 6

This was carried out in the same manner as Example 1, except that the relax roller/heat setting roller speed ratio was 1.08. The physical properties of the obtained polyamide 6/6 fibers and the evaluation results for the woven fabric are shown in Table 1.

TABLE 1

| | | | Example 1 | Example 2 | Example 3 | Example 4 | Example 5 | Example 6 |
|---|---|---|---|---|---|---|---|---|
| Physical properties | Size | dtex | 470 | 470 | 350 | 470 | 470 | 470 |
| | Number of filaments | Number | 136 | 72 | 136 | 136 | 136 | 136 |
| | Single fiber size | dtex | 3.5 | 6.5 | 2.6 | 3.5 | 3.5 | 3.5 |
| | Strength | cN/dtex | 8.3 | 8.3 | 8.3 | 8.3 | 8.3 | 8.3 |
| | Stress retention | % | 7.7 | 8.6 | 8.3 | 8.7 | 6.3 | 8.2 |
| Production conditions | Oil type | — | Aqueous | Aqueous | Aqueous | Aqueous | Aqueous | Aqueous |
| | High temperature time | msec | 93 | 93 | 93 | 53 | 93 | 93 |
| | Heat setting roll temperature | ° C. | 190 | 190 | 190 | 190 | 200 | 190 |
| | Relaxing roll temperature | ° C. | 185 | 185 | 185 | 185 | 185 | 185 |
| | Relaxing roll speed/heat setting roll speed | — | 1.03 | 1.03 | 1.03 | 1.03 | 1.03 | 1.08 |

TABLE 1-continued

|  |  |  | Example 1 | Example 2 | Example 3 | Example 4 | Example 5 | Example 6 |
|---|---|---|---|---|---|---|---|---|
| Evaluation | Fluff quality | — | | VG | VG | VG | VG | G | G |
| | Post-weaving wrinkles | — | | G | G | G | G | G | G |
| | Exp CV | % | 2.6 | 2.4 | 2.8 | 2.1 | 3.1 | 2.5 |

Comparative Example 1

This was carried out in the same manner as Example 1, except that the temperature of the relax roller was 195° C., and the total contact time between the heat setting roller and relax roller was 151 msec. The physical properties of the obtained polyamide 6/6 fibers and the evaluation results for the woven fabric are shown in Table 2. The obtained fibers had a long contact time with the rollers at 190° C. and above and a higher relaxing roll temperature in the heat setting step and relaxing step, and therefore relaxation treatment was carried out at a high temperature, resulting in progressive strain relaxation within the fibers and a lower stress retention. The woven fabric using the fibers had numerous wrinkles and highly variable air permeability. The physical properties of the obtained polyamide 6/6 fibers and the evaluation results for the woven fabric are shown in Table 2.

Comparative Example 2

This was carried out in the same manner as Example 1, except that the number of winds on the heat setting roller was 2 times, and the contact time with the heat setting roller was 26 msec. The physical properties of the obtained polyamide 6/6 fibers and the evaluation results for the woven fabric are shown in Table 2. Because the obtained fibers had a short contact time with rollers at 190° C. or higher in the heat setting step and insufficient growth of crystals in the fiber interiors, the crystal layer formed on the fiber outer layer portions was small and the fibers were prone to infiltration of water molecules into the fiber interiors, resulting in a high degree of heat-induced strain relaxation after immersion in water, and low stress retention. The woven fabric using the fibers had numerous wrinkles and highly variable air permeability. The physical properties of the obtained polyamide 6/6 fibers and the evaluation results for the woven fabric are shown in Table 2.

Comparative Example 3

This was carried out in the same manner as Example 1, except that the number of winds on the heat setting roller was 9 times, and the contact time with the heat setting roller was 119 msec. The physical properties of the obtained polyamide 6/6 fibers and the evaluation results for the woven fabric are shown in Table 2. The obtained fibers had a long contact time with rollers at 190° C. and above in the heat setting step, resulting in progressive strain relaxation within the fibers and lower stress retention. The woven fabric using the fibers had numerous wrinkles and highly variable air permeability. The physical properties of the obtained polyamide 6/6 fibers and the evaluation results for the woven fabric are shown in Table 2.

Comparative Example 4

This was carried out in the same manner as Example 1, except that the relax roller/heat setting roller speed ratio was 1.13. The physical properties of the obtained polyamide 6/6 fibers and the evaluation results for the woven fabric are shown in Table 2. Since the obtained fibers were stretched at a high stretch ratio after progressive crystallization in the heat setting step, the fibers suffered breakage from the crystal portions that failed to follow deformation, and generated a large amount of fluff. Since the crystal layer was destroyed by stretching, water molecules tended to easily infiltrate into the fiber interiors, increasing strain relaxation by heating after immersion in water, and lowering the stress retention. The woven fabric using the fibers exhibited generation of numerous wrinkles and highly variable air permeability. The physical properties of the obtained polyamide 6/6 fibers and the evaluation results for the woven fabric are shown in Table 2.

Comparative Example 5

This was carried out in the same manner as Example 1, except that the temperature of the heat setting roller was 210° C. The physical properties of the obtained polyamide 6/6 fibers and the evaluation results for the woven fabric are shown in Table 2. The obtained fibers had a high heat setting roll temperature of 210° C. in the heat setting step, resulting in progressive strain relaxation within the fibers and lower stress retention. The woven fabric using the fibers had numerous wrinkles and highly variable air permeability. The physical properties of the obtained polyamide 6/6 fibers and the evaluation results for the woven fabric are shown in Table 2.

Comparative Example 6

This was carried out in the same manner as Example 1, except that the temperature of the heat setting roller was 170° C. The physical properties of the obtained polyamide 6/6 fibers and the evaluation results for the woven fabric are shown in Table 2. Because the obtained fibers had a low heat setting roll temperature of 170° C. in the heat setting step and insufficient growth of crystals in the fiber interiors, the crystal layer formed on the fiber outer layer portions was small and the fibers were prone to infiltration of water molecules into the fiber interiors, resulting in a high degree of heat-induced strain relaxation after immersion in water, and low stress retention. The woven fabric using the fibers had numerous wrinkles and highly variable air permeability. The physical properties of the obtained polyamide 6/6 fibers and the evaluation results for the woven fabric are shown in Table 2.

Comparative Example 7

This was carried out in the same manner as Example 1, except that the relax roller/heat setting roller speed ratio was 1.00. The physical properties of the obtained polyamide 6/6 fibers and the evaluation results for the woven fabric are shown in Table 2. The obtained fibers had insufficient tension between the heat setting roll and relaxing roll, with progressive strain relaxation inside the fibers due to the temperature of the heat setting roll, and low stress retention.

The woven fabric using the fibers exhibited generation of numerous wrinkles and highly variable air permeability. The physical properties of the obtained polyamide 6/6 fibers and the evaluation results for the woven fabric are shown in Table 2.

Comparative Example 8

This was carried out in the same manner as Example 1, except that the oil used during spinning was a non-aqueous oil containing no water. The physical properties of the obtained polyamide 6/6 fibers and the evaluation results for the woven fabric are shown in Table 2. Since the obtained fibers did not have an adequately formed crystal layer on the fiber surface sections and water molecules tended to easily infiltrate into the fiber interiors, the strain relaxation by heating was increased after immersion in water, and the stress retention was lower. The woven fabric using the fibers had numerous wrinkles and highly variable air permeability. The physical properties of the obtained polyamide 6/6 fibers and the evaluation results for the woven fabric are shown in Table 2.

Comparative Example 9

This was carried out in the same manner as Example 2, except that the oil used during spinning was a non-aqueous oil containing no water. The physical properties of the obtained polyamide 6/6 fibers and the evaluation results for the woven fabric are shown in Table 2. Since the obtained fibers did not have an adequately formed crystal layer on the fiber surface sections and water molecules tended to easily infiltrate into the fiber interiors, the strain relaxation by heating was increased after immersion in water, and the stress retention was lower. The woven fabric using the fibers had numerous wrinkles and highly variable air permeability. The physical properties of the obtained polyamide 6/6 fibers and the evaluation results for the woven fabric are shown in Table 2.

Comparative Example 10

This was carried out in the same manner as Example 3, except that the oil used during spinning was a non-aqueous oil containing no water. The physical properties of the obtained polyamide 6/6 fibers and the evaluation results for the woven fabric are shown in Table 2. Since the obtained fibers did not have an adequately formed crystal layer on the fiber surface sections and water molecules tended to easily infiltrate into the fiber interiors, the strain relaxation by heating was increased after immersion in water, and the stress retention was lower. The woven fabric using the fibers had numerous wrinkles and highly variable air permeability. The physical properties of the obtained polyamide 6/6 fibers and the evaluation results for the woven fabric are shown in Table 2.

TABLE 2

| | | | Comp. Example 1 | Comp. Example 2 | Comp. Example 3 | Comp. Example 4 | Comp. Example 5 | Comp. Example 6 |
|---|---|---|---|---|---|---|---|---|
| Physical properties | Size | dtex | 470 | 470 | 470 | 470 | 470 | 470 |
| | Number of filaments | Number | 136 | 136 | 136 | 136 | 136 | 136 |
| | Single fiber size | dtex | 3.5 | 3.5 | 3.5 | 3.5 | 3.5 | 3.5 |
| | Strength | cN/dtex | 8.3 | 8.3 | 8.3 | 8.3 | 8.3 | 8.3 |
| | Stress retention | % | −9.9 | 1.8 | −2.8 | 2.5 | −4.2 | 1.0 |
| Production conditions | Oil type | — | Aqueous | Aqueous | Aqueous | Aqueous | Aqueous | Aqueous |
| | High temperature time | msec | 151 | 26 | 119 | 93 | 93 | 0 |
| | Heat setting roll temperature | ° C. | 190 | 190 | 190 | 190 | 210 | 170 |
| | Relaxing roll temperature | ° C. | 195 | 185 | 185 | 185 | 185 | 185 |
| | Relaxing roll speed/heat setting roll speed | — | 1.03 | 1.03 | 1.03 | 1.13 | 1.03 | 1.03 |
| Evaluation | Fluff quality | — | VG | G | VG | P | G | VG |
| | Post-weaving wrinkles | — | P | F | P | F | P | F |
| | Exp CV | % | 15.2 | 8.8 | 11.7 | 6.4 | 13.1 | 9.2 |

| | | | Comp. Example 7 | Comp. Example 8 | Comp. Example 9 | Comp. Example 10 |
|---|---|---|---|---|---|---|
| Physical properties | Size | dtex | 470 | 470 | 470 | 350 |
| | Number of filaments | Number | 136 | 136 | 72 | 136 |
| | Single fiber size | dtex | 3.5 | 3.5 | 6.5 | 2.6 |
| | Strength | cN/dtex | 8.3 | 8.3 | 8.3 | 8.3 |
| | Stress retention | % | 2.6 | −5.9 | −4.6 | −5.6 |
| Production conditions | Oil type | — | Aqueous | Nonaqueous | Nonaqueous | Nonaqueous |
| | High temperature time | msec | 93 | 93 | 93 | 93 |
| | Heat setting roll temperature | ° C. | 190 | 190 | 190 | 190 |
| | Relaxing roll temperature | ° C. | 185 | 185 | 185 | 185 |
| | Relaxing roll speed/heat setting roll speed | — | 1.00 | 1.03 | 1.03 | 1.03 |
| Evaluation | Fluff quality | — | VG | VG | VG | VG |
| | Post-weaving wrinkles | — | F | P | P | P |
| | Exp CV | % | 6.1 | 13.9 | 13.5 | 13.8 |

INDUSTRIAL APPLICABILITY

The polyamide fibers of the invention are suitable for forming a high-density fabric, wherein the use of polyamide yarn with high stress retention results in satisfactory uniformity of fiber tension after weaving, and improvement variation in processing throughput and dynamic air permeability curve exponent, allowing it to be suitably used as a woven fabric for an airbag with low air permeability.

REFERENCE SIGNS LIST

1 Spin head
2 Spinneret
3 Cold air chamber
4 Lubricator
5 Take-up roller
6 First stretching roll
7 Second stretching roll
8 Third stretching roll
9 Heat setting roll
10 Relaxing roll
11 Interlacing apparatus
12 Winder

The invention claimed is:

1. Polyamide fibers for an airbag, wherein
the size of the fibers is 200 dtex to 800 dtex, and
the stress retention is 3.0% or greater, as determined by the following steps 1) to 6):
1) the fibers are immersed for 5 seconds in water at 20° C. and removed out, and subsequently anchored in a thermal shrinkage stress measuring device under an initial load of 0.4 mN/dtex;
2) a heating furnace is set to 130° C. and the fibers are placed in the heating furnace for 5 minutes and heated;
3) the fibers are removed out of the heating furnace and the temperature of the heating furnace is increased to 190° C., without releasing the anchoring that holds the fibers during that time, to maintain fixed lengths,
4) after the furnace has reached 190° C., the fibers are placed in the heating furnace for 3 minutes and heated, and the shrinkage stress at 3 minutes after heating is measured;

5) the fibers are removed from the heating furnace, and the shrinkage stress is measured at 3 minutes after removal; and
6) the stress retention is calculated by the following formula:

$$\text{Stress retention (\%)} = \{[\text{Residual stress from step 5}]/[\text{shrinkage stress from step 4}]\} \times 100,$$

where [shrinkage stress from step 4)] is the value of the shrinkage stress determined in step 4) minus the value of the initial load applied in step 1), and [residual stress from step 5)] is the value of the shrinkage stress determined in step 5) minus the value of the initial load applied in step 1).

2. The polyamide fibers for an airbag according to claim 1, wherein the stress retention is 5.0% or greater.

3. The polyamide fibers for an airbag according to claim 1, wherein the tensile strength is 7.5 cN/dtex or greater.

4. The polyamide fibers for an airbag according to claim 1, wherein the size is 340 dtex to 500 dtex.

5. The polyamide fibers for an airbag according to claim 1, wherein the single fiber size is 1.0 dtex to 7.0 dtex.

6. The polyamide fibers for an airbag according to claim 1, wherein the polyamide fibers for an airbag are polyamide 6/6 fibers.

7. A woven fabric for an airbag comprising polyamide fibers for an airbag according to claim 1.

8. A method for producing polyamide fibers for an airbag according to claim 1, the method including the following steps:
a step of application of a water-containing oil onto yarn spun from a spinneret followed by hot stretching;
a stretching step;
a heat setting step; and
a relaxing step,
wherein in the heat setting step and relaxing step, the contact time between the yarn and a roller at 190° C. or higher is at least 30 msec and less than 110 msec, the temperature of the heat setting roll in the heat setting step is 190° C. to 205° C., the temperature of the relaxing roll in the relaxing step is higher than 100° C. and lower than 190° C., and the speed ratio between the relaxing roll and the heat setting roll satisfies the following formula:

$$1.00 < \text{relaxing roll speed/heat setting roll speed} < 1.10.$$

* * * * *